April 2, 1957   G. E. NICHOLS   2,787,067
CARD-TYPE DISPLAY DEVICE
Filed May 23, 1952   4 Sheets-Sheet 1

Inventor
Gordon E. Nichols
by Roberts Cushman & Grover
Att'ys.

April 2, 1957
G. E. NICHOLS
2,787,067
CARD-TYPE DISPLAY DEVICE
Filed May 23, 1952
4 Sheets-Sheet 2
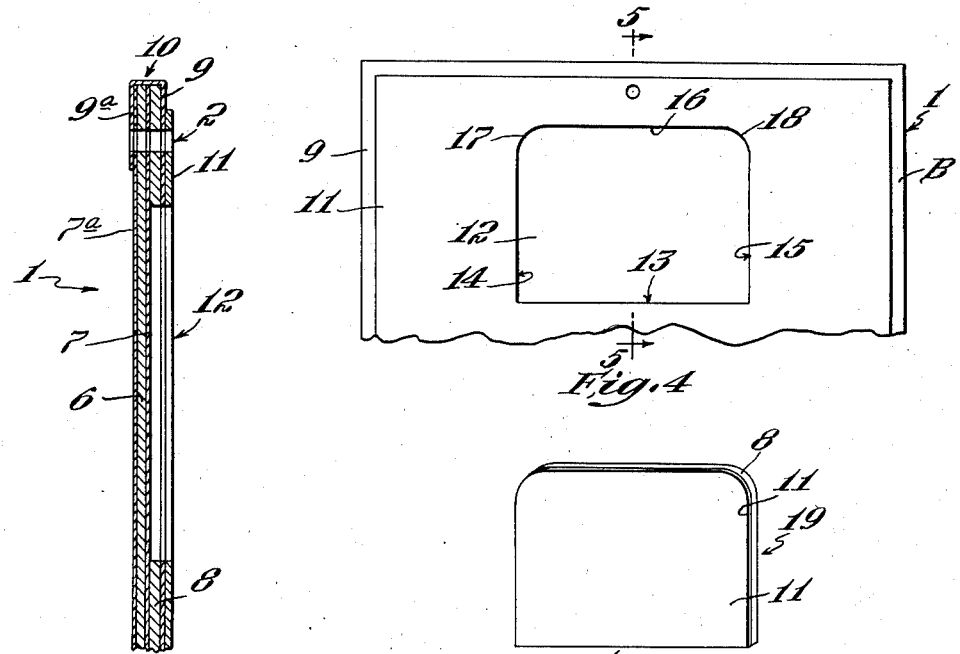
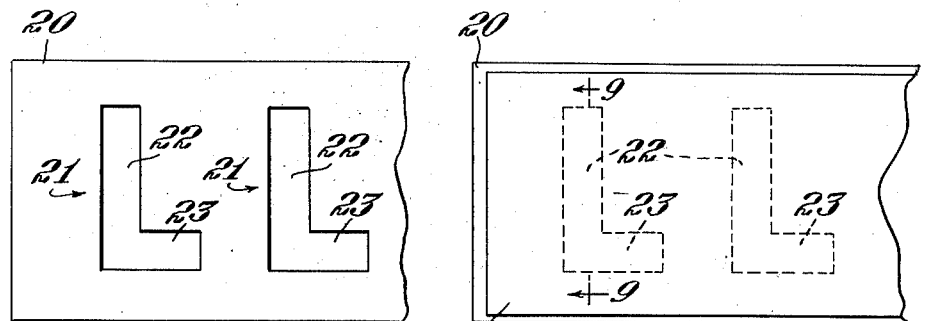
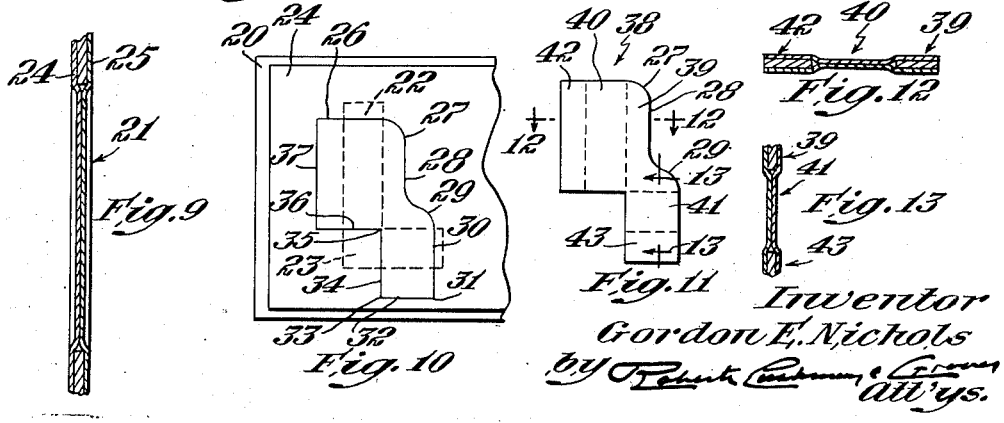
Inventor
Gordon E. Nichols April 2, 1957 G. E. NICHOLS 2,787,067
CARD-TYPE DISPLAY DEVICE
Filed May 23, 1952 4 Sheets-Sheet 3

Inventor
Gordon E. Nichols
by Roberts Cushman & Greaves
Att'ys.

April 2, 1957 G. E. NICHOLS 2,787,067
CARD-TYPE DISPLAY DEVICE
Filed May 23, 1952 4 Sheets-Sheet 4
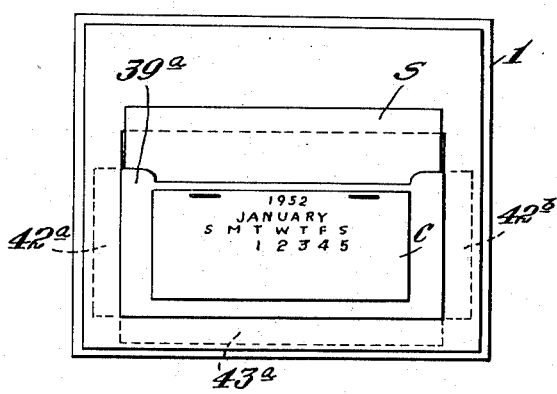
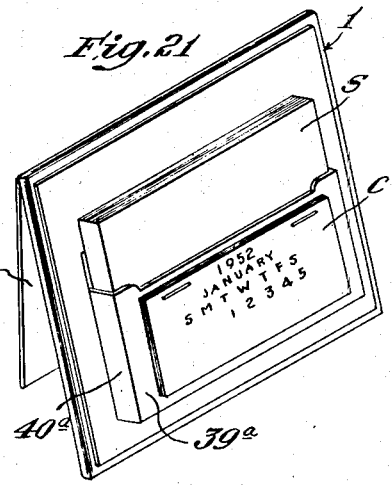
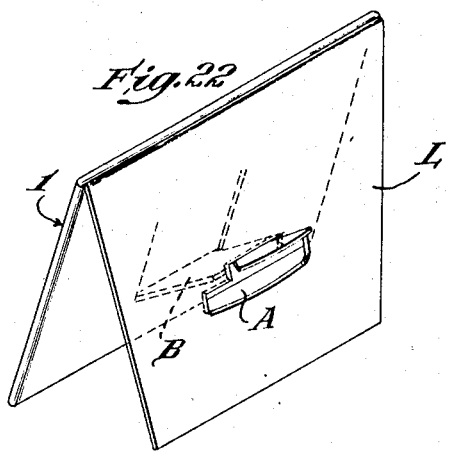
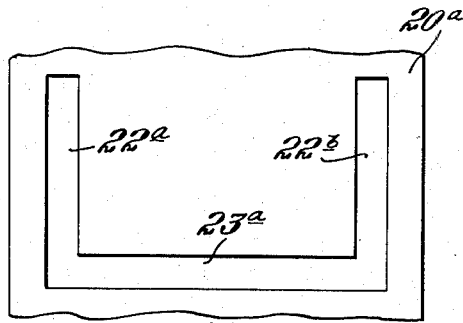
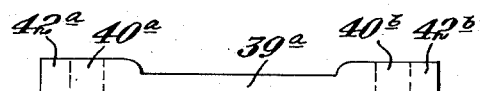
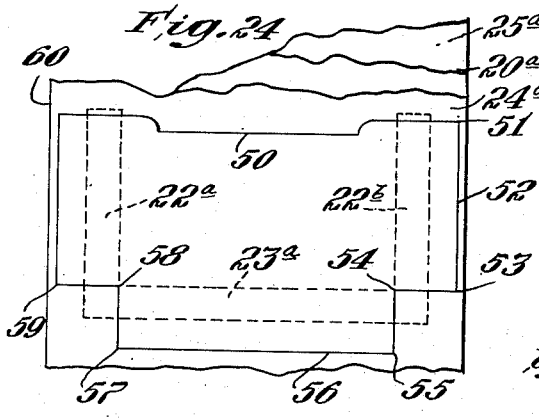
Inventor
Gordon E. Nichols
by Roberts Cushman & Grover
att'ys.

United States Patent Office 2,787,067
Patented Apr. 2, 1957

2,787,067

CARD-TYPE DISPLAY DEVICE

Gordon E. Nichols, Middleboro, Mass., assignor to Winthrop-Atkins Co., Inc., Middleboro, Mass., a corporation of Massachusetts Application May 23, 1952, Serial No. 289,595

4 Claims. (Cl. 40—10)

This invention pertains to display devices and to a novel method of making such display devices. One specific embodiment chosen for illustration is a calendar of the kind wherein a substantially rigid panel supports pocket-forming means designed to hold a stack of cards or the like so that the major portion, at least, of the front card of the stack is exposed to view, the individual cards being independently and freely removable so that, for example the front card may be withdrawn and thereby expose the card which previously was immediately behind it.

One object of the invention is to provide a display device of the above type which may be made cheaply, quickly and easily from flat stock. A further object is to provide a display device which may be shipped in flat or folded condition to the user, and then assembled without the employment of adhesive or the use of staples or like fasteners. A further object is to provide a display device wherein the pocket-forming element or elements are easily assembled with the panel and so retained in position that if desired they may be removed for replacement by others. A further object is to provide a display device which is strong and durable and acceptably pleasing in appearance. A further object is to provide a novel method of making display devices of the above type. Other and further objects and advantages of the invention will be pointed out in the following more detailed description and by reference to the accompanying drawings wherein Fig. 1 is a front elevation of a calendar embodying the present invention, showing cards disposed in the pocket;

Fig. 4 is a fragmentary plan view, illustrating a multiply panel of sheet material, for example stiff cardboard, designed to constitute a support for the card-holding pocket of the calendar and showing a window opening as having been formed in the front plies of this panel;

Fig. 5 is a section, to larger scale, substantially on the line 5—5 of Fig. 4;

Fig. 6 is a perspective view showing the material removed in forming the window opening illustrated in the construction shown in Figs. 4 and 5;

Fig. 7 is a fragmentary plan view showing a sheet of material, for example cardboard, having apertures formed therein as a step in the preparation of bracket members designed, when assembled with the panel, to form the card-receiving pocket;

Fig. 8 is a plan view showing the part illustrated in Fig. 7, but at a later stage in the operation wherein the apertures shown in the cardboard have been covered by relatively thin sheet material;

Fig. 9 is a section on the line 9—9 of Fig. 8;

Fig. 10 is a fragmentary view of the material illustrated in Figs. 8 and 9, but after the formation of an incision therein defining a bracket blank;

Fig. 11 is a plan view of the bracket blank after removal from the multi-ply sheet material of which it originally formed a part;

Fig. 12 is a section on the line 12—12 of Fig. 11;

Fig. 13 is a section on the line 13—13 of Fig. 11;

Fig. 20 is a front elevation of another embodiment of the invention;

Fig. 21 is a front perspective view of the display device of Fig. 20;

Fig. 22 is a rear perspective view of the device of Fig. 20;

Fig. 23 is a fragmentary plan view, to larger scale, illustrative of a step in the preparation of the card-supporting bracket of the device of Fig. 20;

Fig. 24 is a fragmentary plan view illustrative of a further step in the preparation of the bracket of Fig. 20; and Fig. 25 is a plan view of the completed bracket of the device of Fig. 20 in flat condition before folding.

Figure 2:
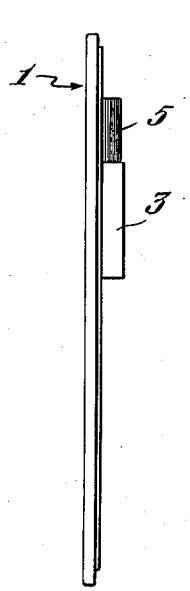
Fig. 2 is a side elevation of the device shown in Fig. 1.
Figure 1:
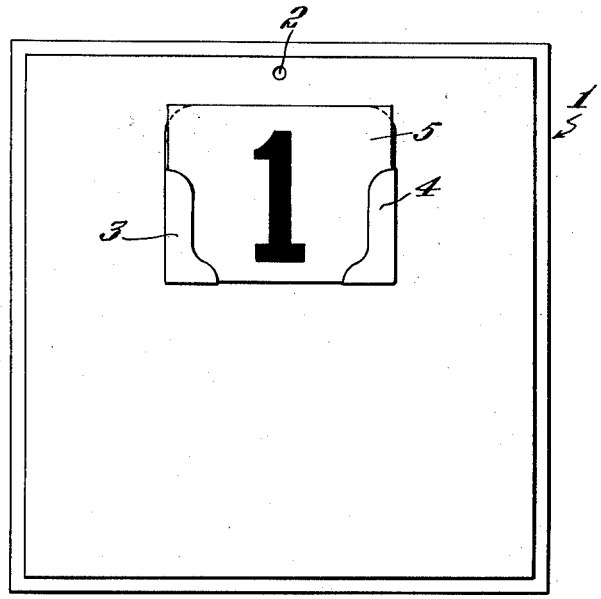
Figure 3:
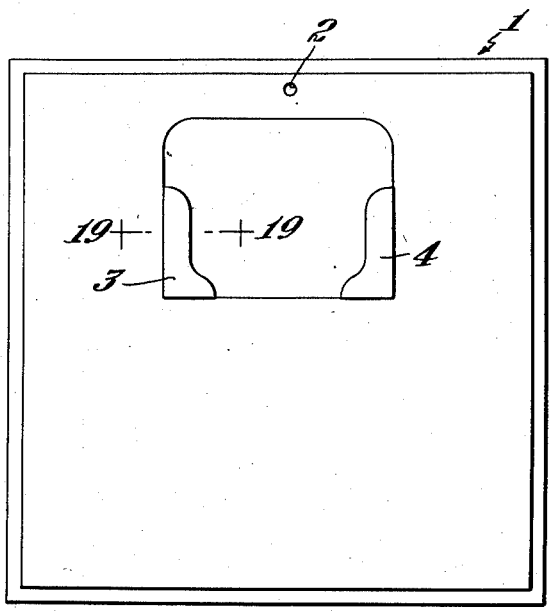
Fig. 3 is a front elevation, similar to Fig. 1, but omitting the stack of cards.

Referring to the drawings (Figs. 1, 2 and 3) the numeral 1 designates the panel portion of the display device, here shown as a card-type calendar, this panel portion being of substantially rigid construction, here shown as rectangular in outline, and as having an opening 2 near its upper edge for the reception of a nail or other support on which the panel may be hung. This panel acts as a support for a pair of laterally spaced brackets 3 and 4 which collectively form a pocket for the pack of independently movable cards, circulars, or other parts 5, on which calendar dates or other matter is printed. For convenience, such material is hereinafter referred to simply as "cards." As here illustrated the brackets 3 and 4 are within the upper half of the panel, thus leaving the lower portion of the panel for advertising or other indicia or information.

Referring to Figs. 4 and 5, the panel is shown as comprising a rear ply 6 of suitable material, for example stiff, heavy cardboard which, as illustrated, is provided with a thin adherent finish sheet 7, for instance of paper, at its front face and likewise a similar sheet 7ª at its rear face. These finish sheets are not essential to the invention and may be dispensed with or, alternatively, the material of the ply 6 may have finished faces of other type. A second ply 8, which may be of the same material and thickness as the rear ply 6 and which is hereinafter referred to as the "front" ply, and which is preferably of the same size and shape as the rear ply 6, is arranged in registering, assembled relation with the rear ply and suitably united to the latter. As here illustrated the front ply 8 is provided at its front face with a finish or ornamental sheet 9, for example of paper, which is turned over about the edges of the plies 6 and 8, as shown at 10 and extended down over the rear face of the rear ply 6, as shown at 9ª and adhesively united to the ply 6, or more accurately speaking, to the finish sheet 7ª, thus connecting the plies 6 and 8 at their margins while leaving them free from each other at other points. Such an arrangement permits slight relative motion of the plies 6 and 8 which is desirable to avoid warping. As here illustrated a finish or facing play 11, here shown as somewhat thinner than the plies 6 and 8, is adhesively secured to the finish sheet 9 of the front ply 8, this facing ply 11 being here shown as of somewhat smaller size than the front ply 8, thus leaving a border B (Fig. 4) at which the covering sheet 9 of the ply 8 is exposed. While the above mode of forming the supporting panel is desirable, it is to be understood that it is not essential to the practice of the present invention except that whatever procedure be followed should leave the rear and front plies 6 and 8 unattached to each other throughout that area at which the brackets 3 and 4 are to be located.

Having prepared the panel as described, a window aperture 12 (Figs. 4 and 5) is then formed in the front ply (and likewise in the facing ply 11 if the latter be used) at the desired location of the pocket for receiving the cards. As here illustrated, this window aperture has the substantially horizontal sill 13, the laterally spaced, vertical jambs 14 and 15 and the horizontal lintel 16, the latter being connected to the jambs by arcuate portions 17 and 18. The height of this window aperture, between the sill 13 and lintel 16, is not greater and may be less than the height of the cards to be used so that the lintel 16 will not be exposed to view when the cards are in place. On the other hand, the jambs 14 and 15 should be spaced apart a distance slightly greater than the transverse width of the cards so as to provide the necessary space into which the cards may be easily inserted. In forming the window aperture, the panel will be laid upon a suitable support and by means of an appropriately shaped die or dies, an incision or incisions will be formed to outline the window aperture, the edge of the die engaging the rear ply 6, or more accurately, the ornamental covering sheet 7 but not cutting through the rear ply 6. The resultant piece 19 (Fig. 6) of material is then removed, this piece, as shown in Fig. 6, comprising a portion of the original front ply 8, its covering sheet 9, if used, and likewise a piece of the facing ply 11.

The next step, in accordance with a preferred procedure is to provide a sheet 20 (Fig. 7) of stiff sheet material, for example cardboard, which need not be so heavy as the material of the plies 6 and 8. In this core material 20 are formed L-shaped apertures 21 (Fig. 7) each having a vertical leg portion 22 and a horizontal leg portion 23. The height of the leg 22 somewhat exceeds the height of the front wall of the bracket to be formed while the length of the horizontal leg exceeds the greatest width of the front wall of the bracket to be formed. The width of the vertical leg 22 should substantially equal the front-to-rear dimension of the side wall of the bracket to be formed while the top-to-bottom width of the horizontal leg 23 is preferably approximately equal to the front-to-rear dimension of the bottom wall of the bracket to be formed. While it is sufficient to provide a piece 20 of material large enough to form a single bracket blank, it is desirable, for convenience in manufacture, to provide core material 20 of substantial area so that a series of the apertures 21 can be formed, for example by successive cutting operations while feeding the material beneath a reciprocating die.

Having formed the aperture or apertures 21 in the piece of core material 20, the opposite faces of this material are covered with adherent sheets 24 and 25 respectively (Figs. 8 and 9) of relatively thin flexible material such as paper which is desirably of an ornamental character, for instance of the same color and texture as the covering sheet 9 of the front ply 8. These adherent sheets 24 and 25 extend across the aperture or apertures 21 in the core member 20 and are adhesively united to each other where they extend across the aperture 21, as illustrated in Fig. 9.

Having prepared this composite sheet, there is then cut from it a bracket blank, as illustrated in Figs. 10 and 11. This bracket blank may conveniently be formed by the use of a single appropriately shaped die which cuts through the entire thickness of the composite material and forms an incision outlining the bracket blank. This incision comprises the substantially horizontal straight portion 26 (Fig. 10) which crosses the upper part of the vertical leg 22 of the L-shaped incision 21 near the upper end of said leg. This incision 26 merges at the arc 27 with a vertical, substantially straight portion 28 which is spaced from the inner or right-hand edge of the leg 22 of the aperture 21 a distance substantially equal to the desired width of the upright portion of the front wall of the bracket which is to be made. At its lower part the vertical incision 28 merges with a compound curve 29 which, in turn, merges with a substantially straight, vertical portion 30 which crosses the lower leg 23 of the aperture 21 at right angles and which extends down to a point 31, spaced from the lower edge of the leg 23 a distance which equals the desired width of the lower retaining tab of the bracket, as hereafter described. From the point 31 a horizontal portion 32 of the incision extends to a point 33 where it intersects a vertical portion 31 of the incision which crosses the lower leg 23 of the aperture 21 at right angles and in line with the inner or right-hand edge of the leg 22 of the aperture. From the point 35 a horizontal portion 36 of the incision extends across the leg 22 of the aperture 21, at right angles to said leg, and beyond the outer or left-hand edge of the leg 22 a distance equal to the width of the upright attaching tab hereafter described. This incision 36 intersects a vertical incision 37 which extends parallel to the outer edge of the leg 22 of the aperture 21 and intersects the horizontal portion 26 of the incision.

Having formed this incision, the blank 38 (Fig. 11), thereby defined, is removed from the composite sheet material. Since the bottom and side wall portions 40 and 41 are relatively flexible they act also as hinge connections, uniting the relatively stiff front wall portion 39 to the relatively stiff flaps 42 and 43. The blank thus prepared is equally useful to form either of the brackets 3 or 4, being alike at its opposite sides. As thus prepared, the bracket blanks may be shipped in flat form, together with the panel, and then assembled with the panel by the user, thus substantially reducing shipping costs.

Figure 15:
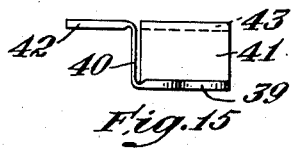
Fig. 15 is a plan view of the bracket shown in Fig. 14.
Figures 14, 16:
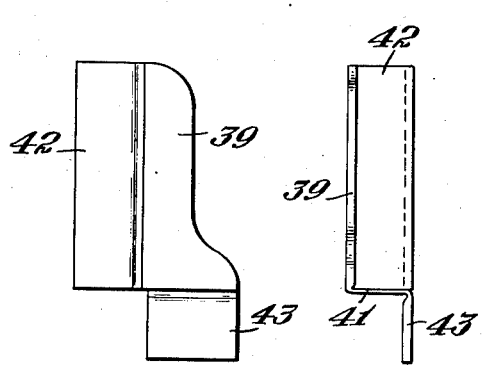
Fig. 14 is a front view of one of the bracket blanks after folding but before application to the panel.
Fig. 16 is a right-hand edge elevation of the bracket shown in Fig. 14.
Figure 17:
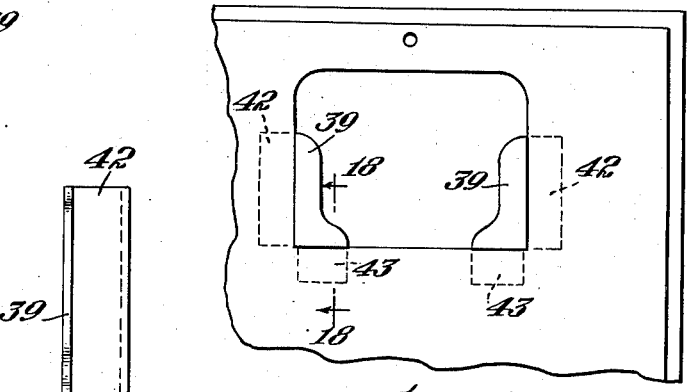
Fig. 17 is a fragmentary front elevation of a panel such as illustrated in Fig. 4 with one of the brackets such as shown in Fig. 14 installed in the window aperture.
Figure 18:
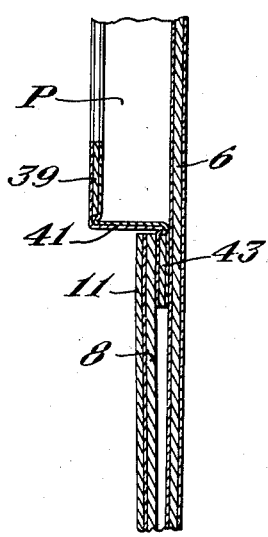
Fig. 18 is a fragmentary section, to larger scale, on the line 18—18 of Fig. 17.
Figure 19:
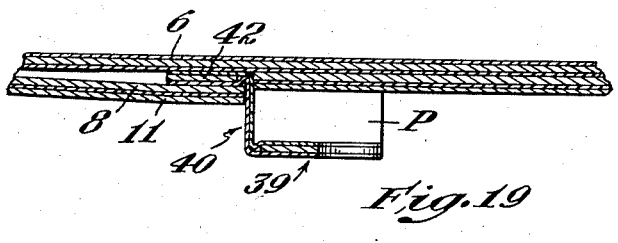
Fig. 19 is a fragmentary section, to larger scale, on the line 19—19 of Fig. 3.

Preparatory to assembling the bracket with the panel 1, the bracket blank is bent (Figs. 14, 15 and 16) along the incision 36 so that the part below said incision lies in a horizontal plane perpendicular to the plane of the part 39 which forms the front wall of the completed bracket. This front wall 39 is substantially L-shaped, its inner or free edge being bounded by the line 27, 28 and 29. The portion of the blank to the left of the inner edge of the leg 22 of the aperture 21 is bent about said edge to lie at right angles to the plane of the part 39, the portions 40 and 41 of the blank, each of which consists only of a double thickness of the covering paper, constituting the side and bottom walls respectively of the completed bracket. The part 43 of the blank which lies below the lower edge of the leg 23 is then bent downwardly at right angles to the part 41 (Figs. 14 and 16) while the part 42 which lies to the left of the outer edge of the leg 22 of the incision 21 is likewise bent (Figs. 15 and 16) at right angles to the part 40, the parts 42 and 43 constituting retaining tabs. These tabs 42 and 43 are of the same thickness as the front wall 39 of the bracket, each consisting of an inner core comprising a part of the material 21 and front and rear plies 24 and 25 of the covering paper. Having bent the blank in this fashion so that its parts occupy the relative positions shown in Figs. 14, 15 and 16, the bracket is introduced into the lower corner of the window aperture 12 formed in the panel, as above described, the front and rear plies 8 and 6 of the panel being forced apart as illustrated in Figs. 18 and 19, so as to permit the tabs 42 and 43 to be introduced between these plies, the plies then being permitted to spring back toward their original position, thus squeezing the tabs 42 and 43 between them so as to exert frictional pressure on the tabs tending to hold the bracket in place. As thus arranged, the side wall 40 of the bracket engages the inner edge of the jamb 14 or 15 of the aperture while the bottom wall 41 of the bracket rests upon the sill 13 of the window aperture. Having disposed the two brackets in the window aperture, one at the right-hand lower corner and one at the left-hand lower corner, the piece 19 of material which was removed from the panel to form the window aperture is slipped down between the side walls 40 of the respective brackets and is then pressed back into the window aperture so as to fill the latter, the material of which the parts are made being sufficiently yieldable so that, although the side and bottom walls 40 and 41 of the brackets are within the bounds of the window aperture, the filler piece 19 may be pressed into place, thus completely filling the aperture and preventing accidental escape or displacement of the brackets. This manner of assembly makes it possible, if desired, to remove the brackets for replacement, for example if the brackets become torn or broken in use or to permit substitution of brackets of different dimensions. However, if desired the tabs 42 and 43 may be coated with adhesive before being assembled with the panel and likewise the rear surface of the part 19 may be coated with adhesive before it is put back in place, thus making a permanent construction.

In Figs. 20 to 25 inclusive, a further embodiment of the invention is illustrated wherein the calendar is in the form of a pad having separable leaves stapled together and attached to the front wall of the pocket, while the pocket is designed to receive circulars or other material to be displayed.

In this embodiment, the panel 1 may be of substantially the same construction as above described, but is here shown as having a supporting leg L which is hinged to the upper edge of the panel proper by a flexible connection, for example by the covering sheet 9 which covers the front face of the front ply of the panel. As illustrated (Fig. 22) this leg L has an aperture A shaped to receive, in interlocking relation, the rear end of a brace member B which is cut from but hingedly connected to the rear ply of the panel, this leg and brace forming no necessary part of the present invention but being useful when the panel is to be supported on a table or the like rather than hung on the wall, as was suggested with respect to the device illustrated in Figs. 1 to 19.

In the embodiment illustrated in Figs. 20 to 25 a single pocket-forming bracket is employed, this bracket having a front wall 39ª which extends across the entire width of the pocket and to which the upright end walls 40ª and 40ᵇ (Fig. 25) are hingedly secured and to whose lower edge the bottom wall or shelf member 41ª is hingedly secure. To the outer edges of the side wall members 40ª and 40ᵇ attaching flaps 42ª and 42ᵇ are hingedly secured, and to the rear edge of the bottom wall or shelf 41ª the retaining flap 43ª is hingedly united.

In making the bracket, which is illustrated in its flat unfolded condition in Fig. 25, there is preferably provided a sheet 20ª (Fig. 23) of relatively stiff material and in this sheet are formed U-shaped incisions comprising the parallel legs 22ª and 22ᵇ united at one end by the transverse leg 23ª. The opposite faces of this sheet, after the formation of these incisions, are covered with relatively thin sheets of material 24ª and 25ª (Fig. 24) which are adhered to the sheet 20ª and which extend across the U-shaped incision, the sheets 24ª and 25ª contacting and being directly united where they bridge across the incision. Having prepared this multi-ply material, with its covered U-shaped incisions, the brackets are cut therefrom, usually by the use of a suitably shaped die. As illustrated in Fig. 24 the die makes an incision comprising the transverse cut 50 which defines the upper edge of the front wall 39ª of the bracket, the opposite end portions of this cut extending transversely across the upper end portions of the legs 22ª and 22ᵇ of the aforesaid U-shaped incision. The cut 50 extends to a point 51, spaced from the right-hand edge of the leg 22ᵇ of the U-shaped incision, then continues vertically down at 52 to the point 53; thence horizontally and across the leg 22ᵇ of the U-shaped incision to the point 54, thence vertically down across the transverse leg 23ª of the U-shaped incision to the point 55; hence horizontally at 56 to the point 57, thence vertically up to the point 58; then horizontally to the point 59, and then vertically up to the point 60 where it intersects the cut 50. Having made this incision, the resultant piece of material is removed, thereby providing the bracket illustrated in Fig. 25.

This bracket blank may be shipped (together with the panel), in flat condition, to the user and the latter will then fold the bracket blank so that the portions 40ª, 40ᵇ and 41ª are perpendicular to the front wall 39ª. The flaps 42ª, 42ᵇ and 43ª then being folded so as to extend outwardly and parallel to the front wall 39ª. The front ply of the panel is then sprung away from the rear ply and the flaps 42ª, 42ᵇ and 43ª are inserted between the plies of the panel thereby frictionally holding the bracket in place. The piece of material, removed in forming the window in the front ply of the panel, may then be replaced, thus securely holding the bracket in position.

While one desirable embodiment of the invention has herein been disclosed by way of example it is to be understood that the invention is broadly inclusive of any and all modifications, for example as respects the material employed, the shape of the window aperture, the shape of the brackets, etc., such as fall within the terms of the appended claims.

I claim:

1. In a display device of the kind wherein a multi-ply panel comprising plies of stiff sheet material supports means defining a pocket open at its top and having front, side and bottom wall members, the front ply of the panel having a window aperture of a width and height approximating the width and height of the pocket, said side and bottom wall members extending rearwardly through the window aperture and having integral flaps which are disposed behind the front ply and between the latter and adjacent plies of the panel, said side and bottom wall members being of relatively thin, flexible material while the flaps are relatively stiff and thicker than the side and bottom wall members.

2. In a display device of the kind wherein a multi-ply panel comprising plies of stiff sheet material supports means defining a pocket open at its top and having front, side and bottom wall members, the front ply of the panel having a window aperture of a width and height approximating the width and height of the pocket, said sides and bottom wall members extending rearwardly through the window aperture and having integral flaps which are disposed behind the front ply and between the latter and adjacent ply of the panel, each flap comprising a core of relatively stiff material having an adherent cover of relatively thin material at each of its opposite faces while the side and bottom wall members consist of integral extensions with said cover material adhesively united directly to each other.

3. That stage product in the production of a card type calendar wherein a rigid panel supports a pair of brackets which collectively form a card-receiving pocket, said stage product being a bracket blank consisting of a substantially L-shaped front wall member of stiff sheet material covered on opposite faces with an adherent sheet of relatively thin, flexible material, and a tab of material similar to that of said front wall member adjacent to but spaced from the exterior edge of each leg of said L-shaped front wall member and flexibly united to the latter by those portions of the covering sheets which extend across the space between said edges of the front wall member and the respective tabs.

4. A bracket as a stage product in the manufacture of a card type calendar comprising a rigid panel which supports brackets collectively forming a card-receiving pocket, said bracket including a substantially L-shaped front wall member having a stiff core and constituting a portion of the front wall of the card-receiving pocket and relatively more flexible side and bottom wall members united to the outer edges of the respective legs of said L-shaped front wall member and which are disposed at substantially right angles to the plane of said wall member, and retaining tabs, of a stiffness approximating that of said front wall member, hinged to the side and bottom walls respectively and which lie in a plane parallel to but spaced rearwardly from the plane of the front wall member.

References Cited in the file of this patent

UNITED STATES PATENTS

| | | |
|---|---|---|
| 160,391 | Coulon | Mar. 2, 1875 |
| 442,023 | Dickinson | Dec. 2, 1890 |
| 472,794 | Macarthy | Apr. 12, 1892 |
| 825,774 | Stumm | July 10, 1906 |
| 1,350,042 | Stealy | Aug. 17, 1920 |
| 2,080,733 | Mull | May 18, 1937 |
| 2,496,884 | Miles | Feb. 7, 1950 |
| 2,524,306 | Buzzerd | Oct. 3, 1950 |
| 2,531,375 | Delegard | Nov. 21, 1950 |
| 2,568,458 | Nichols | Sept. 18, 1951 |
| 2,616,618 | Zurawski | Nov. 4, 1952 |
| 2,622,055 | Lieder | Dec. 16, 1952 |
| 2,627,212 | Connor | Feb. 3, 1953 |

FOREIGN PATENTS

| | | |
|---|---|---|
| 572,770 | Germany | Mar. 23, 1933 |
| 914,747 | France | Oct. 16, 1946 |